No. 815,102. PATENTED MAR. 13, 1906.
J. E. LEA.
LIQUID FLOW MEASURER AND RECORDER.
APPLICATION FILED FEB. 23, 1905.
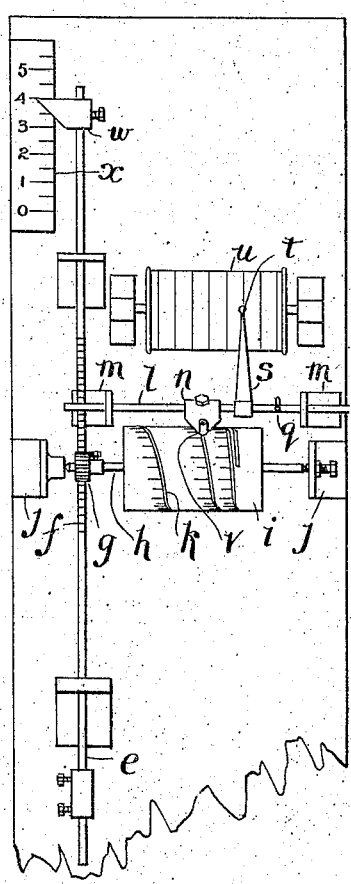
Fig I
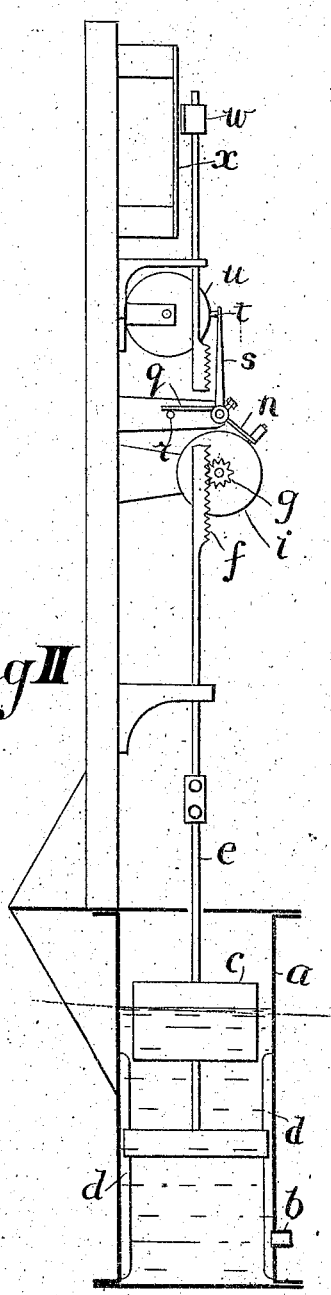
Fig II
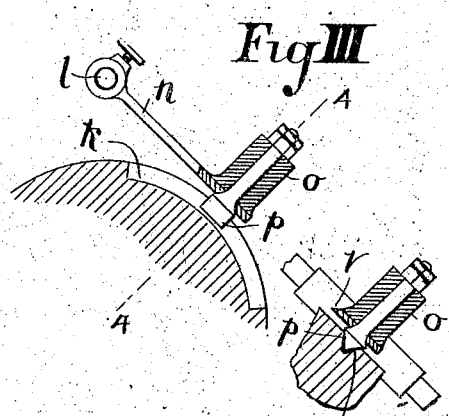
Fig III
Fig IV
Witnesses: J. M. Fowler Jr., Henderson R. Hill
Inventor: James E. Lea
By Mason, Fenwick & Lawrence, Attys

UNITED STATES PATENT OFFICE.

JAMES EDWARD LEA, OF EAST RAND, TRANSVAAL.

LIQUID-FLOW MEASURER AND RECORDER.

No. 815,102. Specification of Letters Patent. Patented March 13, 1906.

Application filed February 23, 1905. Serial No. 247,208.

*To all whom it may concern:*

Be it known that I, JAMES EDWARD LEA, engineer, a British subject, residing at the East Rand, district of Witwatersrand, in the Colony of the Transvaal, have invented new and useful Improvements in Liquid-Flow Measurers and Recorders, of which the following is a specification.

This invention relates to the construction of apparatus for measuring and recording the quantity of a stream of liquid, such apparatus being of that class in which the liquid is passed over a weir or through an orifice and the recording and measuring instruments are so operated by means of a float that the positions of their pointers vary with the head of liquid over the weir or orifice.

The object of the invention is to provide a novel and improved indicating and recording mechanism which while being simple and not liable to get out of order produces very accurate and easily-computed record-cards, enables the quantity of water flowing at any moment to be read off with extreme accuracy, and permits the correctness of the adjustment of the recording and indicating devices to be readily checked at any time.

In the accompanying drawings, Figure I is a front and Fig. II a side elevation of one form of the improved mechanism. Figs. III and IV are drawn to an enlarged scale and illustrate details, the latter being a section upon 4 4, Fig. III.

According to this invention the float-chamber $a$ is connected, by means of a pipe $b$, with the weir-box or its equivalent, so that the level of the water in it is identical with that above the weir or orifice. The float $c$, prevented from turning in the chamber by the guides $d$, carries a vertical rod $e$, whereon is formed a rack $f$, meshing with a toothed wheel $g$, fixed by a set-screw upon one end of a spindle $h$, carrying a drum $i$ and supported horizontally in brackets $j$ $j$, one of which is adjustable to prevent end play. The drum $i$ is thus rotated directly in proportion to the variations in the height of water above the weir, and in order to convert this movement into one corresponding with the variations in the rate of flow of the liquid there is cut upon the cylindrical surface of the drum a V-groove $k$, forming a helix which is of varying pitch except in the special case mentioned below. The expanded form of the groove is the curve obtained by plotting heights of the liquid above the weir as abscissæ with their corresponding rates of flow as ordinates, and thus it varies according to the type of weir-notch employed.

A rod $l$ is arranged directly above the drum $i$ and parallel to the axis thereof to slide freely in bearings $m$ $m$. Upon it is detachably fixed a primary or transversely stiff arm $n$, Figs. III and IV, having at its extremity a long and comparatively heavy bearing $o$, in which a V-shaped block $p$, fitting the groove $k$, is so journaled as to be capable of rotation about an axis radial to the drum $i$. The arm $n$ is substantially tangential to the drum, so that the tangential pressure exerted by the groove upon the block $p$ has no tendency to twist the rod $l$ and there is no tendency to thrust the block $p$ into or out of the groove. The arrangement is such as to give a transmission of motion from the drum to the rod $l$ attended by comparatively little friction and to reduce play between the parts to a minimum. The weight of the bearing $o$ is usually sufficient to retain the block $p$ in the groove $k$; but to guard against its accidental displacement a light arm $q$ projects rearward from the rod $l$ and bears lightly against a retaining-guide $r$. Also clipped to the rod $l$ is an auxiliary arm $s$, carrying a pen $t$, adapted to describe a line upon the chart of a suitable recording instrument, such as a Bristol gage or the clockwork-driven cylinder shown at $u$, which is arranged to turn at a uniform rate. It will be evident that since the movements of the pen $t$ are directly proportional to the rate of flow over the weir the area of the diagram described upon the chart of the recording-cylinder will also be exactly proportional to the quantity passed, and thus its computation will be a very simple matter.

For the purpose of observing the rate of flow at any instant one edge of the groove $k$ is scaled out and properly figured and a pointer $v$, Fig IV, projects from the arm $n$ toward the scale. The great length of the groove enables very accurate readings to be obtained by this means. A second pointer $w$ is detachably fixed to the top of the float-rod $e$ and exhibits upon a fixed scale $x$ the actual height of liquid above the weir. This scale is also employed in adjusting the zero positions of the other indicators as follows: The water above the weir, and therefore that in the float-chamber, having been brought exactly to the zero level by means of a hook-gage or otherwise, the pointer $w$ is set opposite the zero of the scale $x$. When great precision is desirable, a vernier is used instead of the pointer w. The set-screw securing the pinion g is then slacked and the drum turned until the pointer v is above the zero on the drum-scale. A chart having been carefully fixed upon the cylinder u, the pen t is shifted upon its rod until it touches the zero-line of the card, and the adjustment is thereupon completed by tightening up all the fastenings. The correctness of the adjustment can be ascertained at any time by pressing down the float till the pointer w is at zero and noting the readings of the pointer v and the pen t.

It is to be understood that certain modifications of the apparatus described may be made without departure from the invention. For example, instead of the groove k a raised strip of similar shape may be formed on the drum, the block p being grooved accordingly, or the cylinder u, the rod l, and the drum i may be set vertically, the latter being operated by bevel-gearing, or, again, when the float-chamber and the indicators are required to be at some distance apart the mechanism which transmits the motion of the float to the drum may be varied accordingly.

In the case where the stream is passed through a notch so shaped as to give an outflow directly proportional to the height of liquid above it no motion-rectifying mechanism is needed; but the present invention may still be advantageously employed on account of the accuracy of the readings obtainable from the drum-groove, which in this case of course becomes a regular helix.

I claim as my invention—

1. In an apparatus of the character described, the combination with a support, of a float, a vertically-movable rod secured to said float, a rack formed upon the upper portion of said rod, a drum carried by said support, a toothed wheel connected to said drum and meshing with the rack formed upon said rod, a longitudinally-movable member provided with arms secured contiguous to said drum, a recording-cylinder secured contiguous to said longitudinally-movable member, a stationary scale formed upon said support, and a detachable pointer secured to said rod contiguous to said scale.

2. In an apparatus of the character described, the combination with a support, of a drum and a stationary scale carried by said support, a float-actuated, vertically-movable rod positioned upon said support, said rod adapted to impart movement to said drum, a pointer positioned upon said rod contiguous to said scale, a recording-cylinder carried by said support, and longitudinally - movable members coacting with said drum and recording-cylinder.

3. In an apparatus of the character described, the combination with a support, of a float-actuated, movable rod carried by said support, said rod provided with a rack, a drum and a recording-cylinder carried by said support, said drum provided with a helical groove and said grooved portion provided with a scale upon one side, a toothed wheel connected to said drum and meshing with said rack upon the rod, indicating means formed upon said support and one end of said rod, longitudinally-movable arms secured contiguous to said drum and cylinder, one of said arms provided with a pointer adapted to work in the groove of said drum.

4. In an apparatus of the character described, the combination with a support, of parallel, revoluble members carried by said support, one of said members provided with a scaled surface, a longitudinal, movable pointer coacting with said member provided with a scaled surface, recording means coacting with said pointer and one of said revoluble members, a stationary scale formed upon said support, and a movable pointer coacting with said stationary scale and moving in timed relation to said revoluble member provided with a scale.

5. In an apparatus of the character described, the combination of revoluble, parallel indicating and recording members, and longitudinally-movable means for indicating upon said indicating member and recording upon said recording member.

6. In an apparatus of the character described, the combination with a support, of parallel, revoluble members carried by said support, longitudinally-movable arms coacting with said revoluble members, and a slidable float-actuated member carried by said support and coacting with one of said revoluble members for imparting movement to said arms.

7. In an apparatus of the character described, the combination with a support, of a stationary scale and a revoluble member provided with a scale carried by said support, pointers moving in timed relation and registering upon said stationary scale and revoluble member, and recording means coacting with said revoluble member and pointers.

8. In an apparatus of the character described, the combination with a support, of parallel, revoluble recording and indicating surfaces carried by said support, longitudinal movable arms carried by said support and coacting with said revoluble surfaces, and float-actuated means coacting with one of said surfaces for imparting movement thereto and said arms.

9. In an apparatus of the character described, the combination with a support, of parallel, revoluble indicating and recording surfaces, a stationary indicating-surface carried by said support, longitudinally-movable pointers carried by said support and coacting with said surfaces, and slidable means provided with a pointer coacting with one of said surfaces and adapted to impart movement to said pointers, said pointer carried by said slidable means coacting with said stationary indicating-surface.

10. In a mechanism of the class described, the combination with a support, of a drum provided with a helical groove carried by said support, a longitudinal movable rod secured parallel to said drum and carried by said support, a stationary scale secured to said support, a vertically-movable, racked rod carried by said support, a toothed wheel connected to said drum and meshing with the racked portion of said rod, a removable pointer secured to the upper portion of said rod and coacting with said stationary scale, a recording-cylinder carried by said support, a primary and an auxiliary arm secured to said longitudinally-movable rod, said primary arm provided with a block positioned within the groove of said drum, and said auxiliary arm provided with a pen engaging the recording-cylinder.

11. In a mechanism of the class described, the combination with a support and a float, of a slidable rod connected to said float, and positioned upon said support, a drum carried by said support and coacting with said rod, a recording-cylinder carried by said support, a pen coacting with said recording-cylinder, and means connected to said pen and adapted to travel longitudinally of said drum, when the drum is rotated for causing said pen to travel longitudinally of said cylinder.

12. In an apparatus of the character described, the combination with a drum provided with a helical groove, a scale formed upon said drum, a recording-cylinder, a primary arm provided with a pointer, the pointer working in said groove of the drum, an auxiliary arm fixedly connected to said primary arm and adapted to record upon said recording-cylinder, and means adapted to rotate said drum, and thereby cause said pointer to travel in said groove for moving said arms.

13. In a device of the character described, the combination of revoluble, parallel indicating and recording members, and movable means for indicating upon said indicating member and recording upon said recording member.

14. In an apparatus of the character described, the combination of revoluble, indicating and recording members, and movable means for indicating upon said indicating member and recording upon said recording member.

15. An apparatus of the character described, the combination of revoluble indicating and recording members, means traveling longitudinally of both of said members for indicating upon said indicating member and recording upon said recording member.

In testimony whereof I have signed this specification in the presence of two subscribing witnesses.

JAMES EDWARD LEA

Witnesses:
WILLIAM WELMAN VINCENT,
HAROLD ERNEST KISCH.